Dec. 16, 1958 W. H. SILVER ET AL 2,864,296
TRACTOR-MOUNTED DISK PLOW
Original Filed April 23, 1953 2 Sheets-Sheet 1

INVENTORS.
WALTER H. SILVER
OREY W. OERMAN
BY
ATTORNEYS

Dec. 16, 1958 W. H. SILVER ET AL 2,864,296
TRACTOR-MOUNTED DISK PLOW
Original Filed April 23, 1953 2 Sheets-Sheet 2
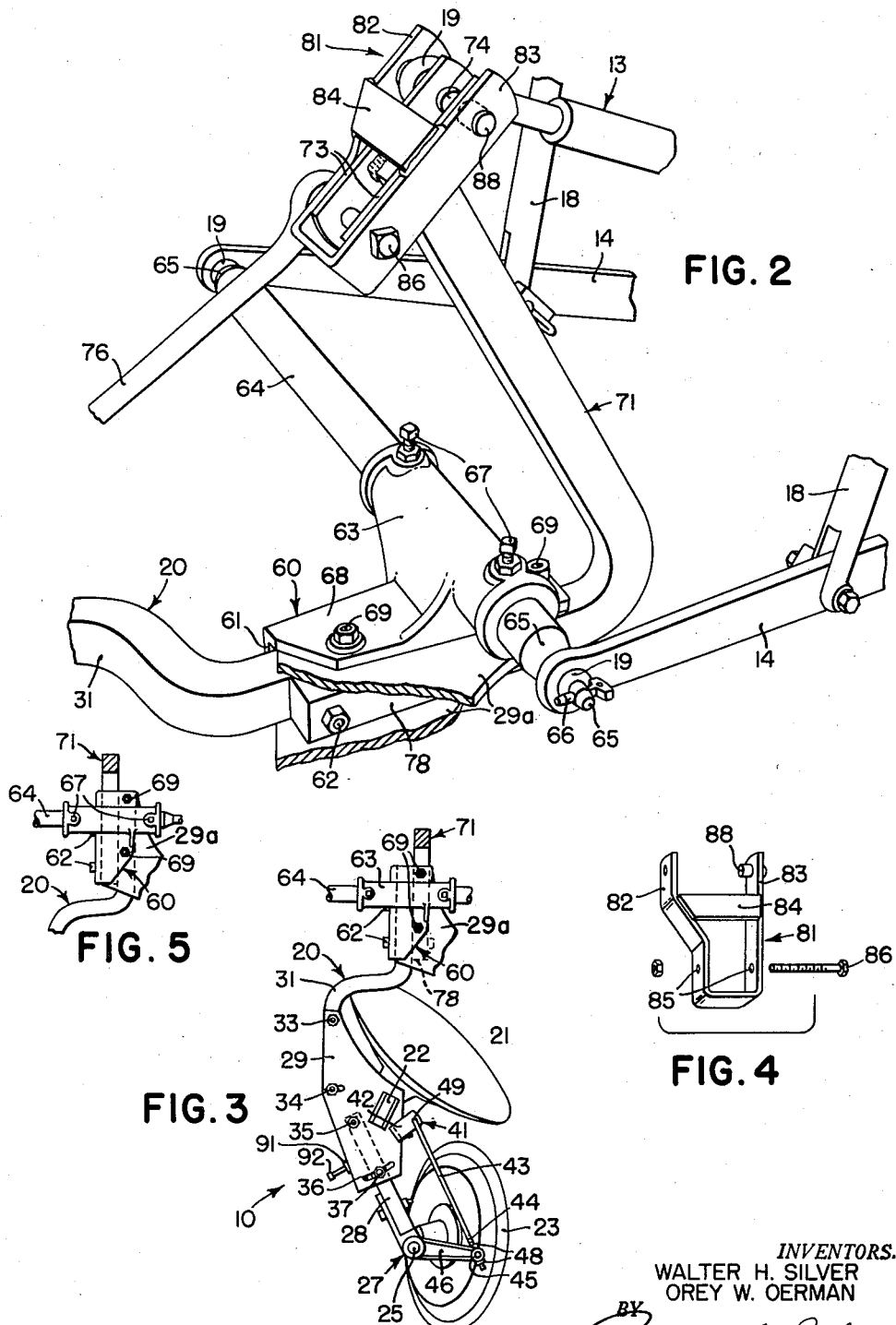
INVENTORS.
WALTER H. SILVER
OREY W. OERMAN
ATTORNEYS

United States Patent Office 2,864,296
Patented Dec. 16, 1958

2,864,296

TRACTOR-MOUNTED DISK PLOW

Walter H. Silver and Orey W. Oerman, Moline, Ill., assignors, by mesne assignments, to Deere & Company, a corporation of Delaware Continuation of application Serial No. 350,606, April 23, 1953. This application June 4, 1956, Serial No. 589,072

7 Claims. (Cl. 172—254)

This application is a continuation of our copending application, Ser. No. 350,606, filed April 23, 1953, now abandoned, for Tractor-Mounted Plow Frame.

The present invention relates generally to agricultural implements and more particularly to implements of the type that may readily be connected to the rear ends of the upper and lower draft links of a propelling and supporting tractor.

The object and general nature of the present invention is the provision of an agricultural implement, such as a disk plow, having new and improved means to accommodate arranging the disk plow for different soil conditions, different widths of cut and different wheel treads to which the tractor may be adjusted, without materially affecting the proper trailing and operating characteristics of the tractor hitch linkage. More particularly, it is a feature of this invention to provide an agricultural implement in which means is incorporated to enable the implement to be adjusted to accommodate the above-mentioned factors while, at the same time, reacting through the upper link of the tractor hitch system in such a way as to avoid objectionable lateral components of force which, if present, might interfere with the proper operation of the implement.

More specifically, it is one feature of this invention to provide a rear furrow wheel construction whereby the position of the rear furrow wheel may be adjusted laterally without materially affecting the angle of lead which it is desired to have incorporated in the rear furrow wheel arrangement. It is an additional feature of this invention to provide an adjustable connection between the front portion of the implement and the lower tractor draft links whereby the implement may be operated in the desired position irrespective of changes in the width of cut of the ground-engaging tools, and further, it is an object of this invention to provide means for adjusting the plow to accommodate changes in the wheel tread of the tractor drive wheels whereby, under certain conditions of operation, the tractor drive wheels may be spaced apart farther than is necessary under other conditions. More particularly, it is a feature of this invention to provide implement draft connections so constructed and arranged that the mast section, which connects with the upper link of the tractor draft linkage, may be properly aligned with the upper link of the tractor notwithstanding changes made in the implement to vary the width of cut and/or changes made in the wheel tread of the tractor.

These and other objects and advantages of the present invention will be apparent to those skilled in the art after a consideration of the following detailed description, taken in conjunction with the accompanying drawings, in which:

Figure 2 is a fragmentary view, similar to Figure 1, showing certain modifications.

Figure 3 is a fragmentary plan view of the rear end of the implement.

Figure 4 is a perspective view of the mast bracket adapter.

Figure 5 is a fragmentary view, similar to Figure 3, showing an optional positioning of the mast and frame bars.

Figure 1:
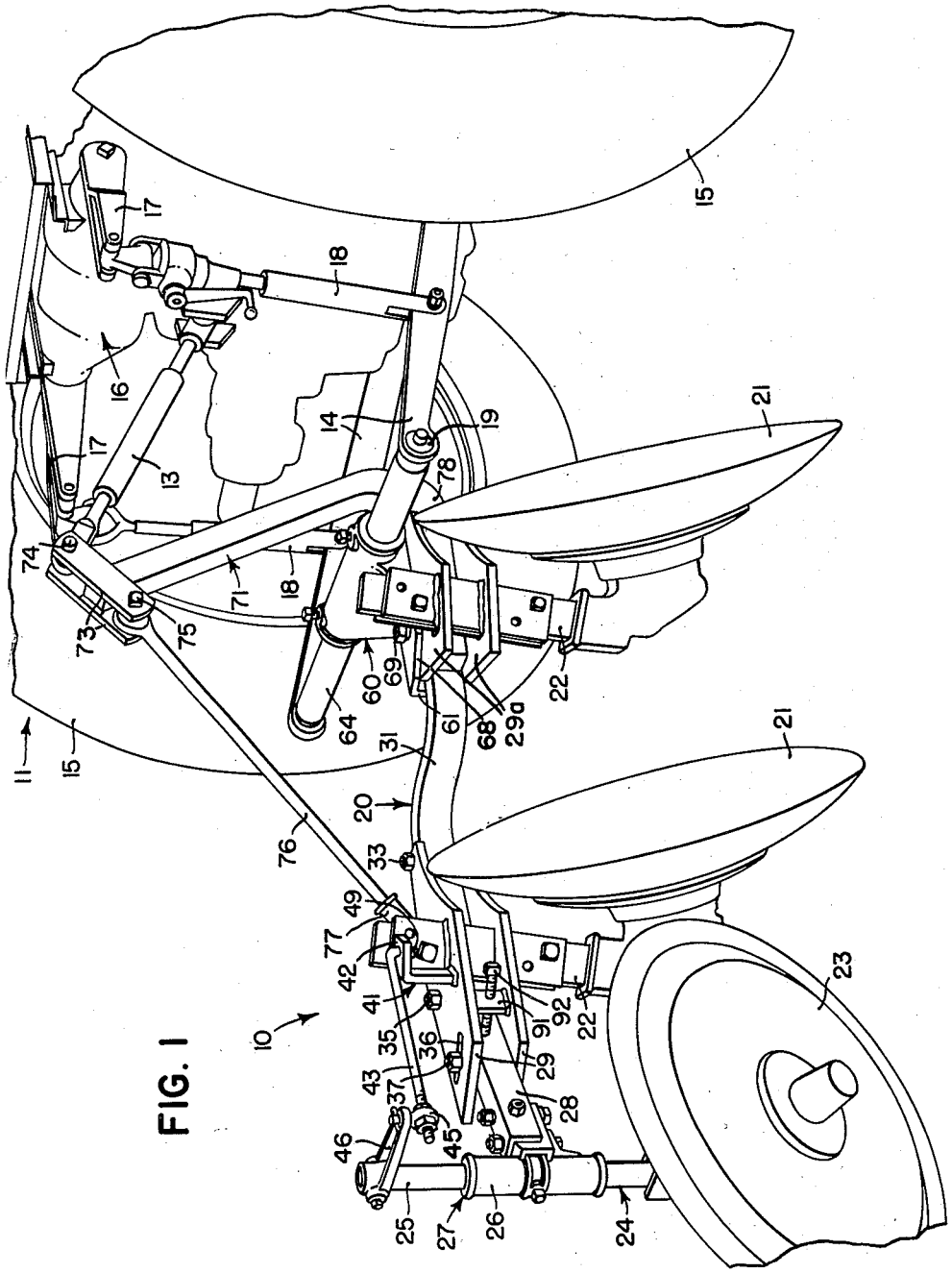
Figure 1 is a perspective view of an implement, together with a portion of the associated tractor, incorporating the principles of the present invention.

Referring first to Figure 1, the principles of the present invention have been shown by way of illustration as incorporated in a tractor-mounted disk plow, indicated in its entirety by the reference numeral 10, particularly constructed and arranged to be connected to a tractor 11 of the type that is provided with upper and lower draft links 13 and 14. The tractor 11, which is conventional so far as the present invention is concerned, is provided with rear drive wheels 15 and a power lift unit 16 that includes a pair of lift arms 17 that are connected through lift links 18 with the lower draft links 14. Control of the power lift unit 16 is, at least partially, made responsvie to the forwardly exerted thrust transmitted to the tractor through the upper link 13, which type of control is conventional so far as the present invention is concerned. The rear ends of the upper and lower links 13 and 14 are provided with ball connectors 19, and the front ends of these links are connected by similar ball connectors with the tractor for both vertical as well as lateral swinging movement, this also being conventional.

The implement 10 comprises, among other things, frame structure 20, a plurality of ground-working tools in the form of disks 21 connected with the frame structure 20 through standards 22, and a rear furrow wheel 23 that is mounted on an axle 24 having a vertical spindle section 25 slidable and rotatable in a vertical sleeve section 26 that forms a part of a rear bracket 27. The latter is connected with the frame 20 through a laterally swingable or laterally adjustable bar 28 that is disposed between upper and lower plates 29 that serve as means, not only connecting the rear standard 22 with a generally rearwardly extending bar 31 that forms a part of the frame structure 20, but also as means for connecting the bar 28 with the frame member 31. The front standard 22 is connected with the plow frame structure by plates similar to the plates 29, which construction will be described below.

Referring to Figure 3, the plates 29 are generally triangular in configuration and apertured at their forward portions to receive bolts 33 and 34 that fix the upper and lower plates 29 to the rear end of the frame bar 31. The rear portions of the plates 29 are also apertured, forwardly of the rear ends thereof, to receive a pivot bolt 35 that extends through an opening in the forward end of the laterally swingable arm 28, the rear portions of the plates 29 having arcuate slots 36 formed therein to receive a clamping bolt 37 that extends downwardly through an opening in the laterally swingable bar or support 28. The upper plate 29 carries an angle lug 41 having an upper apertured portion 42 that receives the forward end of a lead-adjusting link member 43, the link 43 being thus pivotally connected with the plow frame at a point spaced from the pivot bolt 35 in a generally lateral direction. The rear end of the link 43 is threaded, as at 44, and is adjustable in a threaded swivel or pivot 45 that extends through an opening in the outer end of an adjusting arm 46 that is fixed to the upper end of the spindle section 25 of the axle 24. A pair of lock nuts 48 are carried by the link 43 for the purpose of fixing the link to the swivel or pivot 45. Loosening one nut and tightening the other serves to adjust the effective length of the link 43, and it will be observed that the length of the arm 46 is substantially the same as the distance between the pivot 35 and the front end, indicated at 49, of the link 43. It will also be noted that the length of the link 43 is substantially the same as the distance between the spindle 25 and the pivot 35, whereby the link 43 is disposed in substantial parallelism with respect to the laterally adjustable arm 28. Therefore, when the bolts 35 and 37 are loosened and the arm 28 adjusted laterally to change the lateral position of the rear furrow wheel 23, the lead, or angle of the wheel relative to the direction of travel, is not changed. However, the amount of lead imparted to the wheel 23 may be changed or varied, as desired, by adjusting the effective length of the link 43.

Referring now to Figure 2, the frame 20 includes, at the forward portion thereof, a front frame bracket 60, preferably in the form of a casting having a flange 61, apertured to receive bolts 62 by which the front frame bracket may be rigidly connected to the front end of the bar 31, a horizontal section 68, and a transverse sleeve section 63 that slidably receives a crossbar 64. The outer ends of the latter are reduced, as at 65, and receive retainers 66 by which the rear ends of the draft bars 14 may readily be connected to the crossbar 64. The bracket 60 is adapted to be fixed in different lateral positions along the bar 64 by any suitable means, such as locking set screws 67. Also connected to the forward end of the bar 31 is a generally vertically extending mast section 71 formed of a generally V-shaped bar having a lower rearwardly extending section 78 that is apertured and is adapted to extend alongside the front end of the bar 31 and to be rigidly connected to the latter and the bracket 60 by two bolts 69, the forward end of the bar 31 and the section 78 both being disposed underneath the horizontal section 68 of the bracket 60. Thus, the mast section 71 constitutes a rigid part of the plow frame 20. The upper end of the mast section 71 carries a pair of bracket plates 73, preferably welded to the mast 71 in spaced apart relation. The upper portions of the bracket plates 73 are apertured to receive a pin 74 or other suitable fastening means by which the rear end of the upper link 13 may readily be connected with the mast. The lower ends of the bracket plates 73 are apertured to receive a bolt or pin 75 that receives the forward upper end of a brace rod 76, the lower end of which is adjustably connected into a threaded bracket 77 that is rigidly fastened to the plow frame 20, preferably by being connected to the upper plate 29 by the bolt 34. From Figures 1 and 3 it will be noted that the front frame bracket 60 is so constructed that the mast section 71 and frame bar 31 may be connected thereto in either of two positions, one with the lower end 78 of the mast section at the side of the bar 31 opposite the flange 61, or between the front end of the bar 31 and the flange 61. Reference to this adjustment and the purposes thereof will be made below.

The front standard 22 is connected with the plow frame structure 20 by upper and lower plates 29a (Fig. 2) that are similar to the rear plates 29 described above. The front plates 29a are fixed in any suitable way to the front standard and are apertured to receive the bolts 69 that, when the parts are arranged as shown in Figs. 2 and 3, fix the mast section 72 to the bracket 60. As shown in Fig. 2, the plates 29a are disposed above and below the mast section 72, and when the parts are arranged as shown in Fig. 5, the plates 29a are disposed above and below the front end of the beam 31, which is apertured to receive the bolts 69.

The operation of the invention as so far described is substantially as follows.

As will be understood by those familiar with the operation of such implements as disk plows, there is a tendency for the rear end of the disk plow to run toward the land, and for that purpose the rear furrow wheel is angled toward the furrowward side and also is given a slight lead in the furrowward direction. As mentioned above, the amount of furrowward lead, or landward lead, if necessary, may be adjusted by changing the effective length of the link 43. It is also necessary to have the rear furrow wheel operate in the proper position laterally of the rearmost disk, and the furrow wheel may be disposed in the proper position, according to the principles of the present invention, by loosening the bolts 35 and 37 and shifting the frame bar 28 laterally. During this movement, the lead of the rear furrow wheel is not changed, due to the parallel relation between the arm 28 and the link 43.

It will also be understood that when using a tractor of the above-mentioned type, having relatively free laterally swingable draft links, it is necessary that the implement be so connected that the forward reaction at the upper end of the mast section 71 against the rear end of the upper link 13 be applied substantially directly rearwardly of the front end of the link 13; otherwise, objectionable lateral force components will arise. In order to insure that the mast section 71 is properly aligned substantially directly behind the attaching point at the front end of the upper draft link 13, the front frame bracket 60 may be adjusted along the bar 64 by loosening the set screw 67 and shifting the sleeve along the bar to the desired location, after which the locking screws 67 may be tightened to retain the desired adjustment.

To change the width of cut, the bolts 62 are removed and the front end of the beam 31 placed either to the right or to the left of the lower end of the mast section 71, and then it may also be necessary to change the position of the sleeve section 63 along the crossbar 64.

Under certain conditions, as when operating on hillsides where added tractor stability is necessary, it may be desirable to have the tractor wheels 15 operate in their wide setting. In order to secure the advantages of this arrangement, and yet permit the furrowward rear wheel to operate in the previously formed furrow, the present invention contemplates the provision of a mast bracket adapter 81 which permits shifting the plow in the furrowward direction the amount necessary to permit the furrowward rear wheel to operate in the previously formed furrow and yet have the reaction of the mast section applied to the upper link 13 at a point substantially directly rearwardly of the connection of the link 13 with the tractor. The mast bracket adapter of the present invention is shown in Figures 2 and 4. The mast bracket adapter comprises primarily a U-shaped strap member having opposite leg portions 82 and 83 rigidly interconnected by a crosspiece 84. The bracket 81 is provided with a pair of lower apertures 85 to receive a bolt 86 that replaces the bolt 75 (Figure 1) and to which the upper end of the brace 76 may be connected, either at one side or the other, as necessary. The leg or side sections 82 and 83 are spaced apart such distances as to embrace the mast bracket plates 73, and the outer ends of the side sections 82 and 83 are apertured, the aperture in the side 83 receiving a stud 88 firmly fixed therein and adapted to enter the aperture in the right-hand bracket plate 73. The other side section 82 is apertured to receive the pin connector 74 by which the rear end of the draft link 13 is connected with the mast bracket adapter and also with the other mast bracket plate 73.

As shown in Figures 1 and 2, the plow frame and associated parts are assembled so that the lower section 78 of the mast 71 is disposed in the bracket 60 to the right of the front end of the frame bar 21. To provide a more narrow cut per disk, the bolts 62 and 69 may be removed and the mast and frame bars transposed so as to bring the mast section 78 to the left of the front end of the frame bar 31, after which the bolts 62 and 69 may be reinserted and tightened. This is the position of these parts shown in Figure 5. When making this change it is also desirable to change the setting of the bracket 60 on the crossbar 64, which may be done as described above.

The rear frame plates 29 serving as a rear standard bracket carry laterally spaced apart lugs 91 which are apertured and tapped to receive a pair of set screws 92, the inner ends of which are adapted to engage the laterally adjustable bar 28 for the purpose of, first, holding the bar 28 in different positions of adjustment and, second, securing minor changes in the position of the bar 28 when desired.

It will be observed that the adjustability of the front frame bracket 60 along the crossbar 64 readily accommodates disposing the brace 76 either to one side or the other of the mast adapter bracket to accommodate changing the position of the frame bar 31 relative to the front frame bracket 60. Briefly, the function of the mast bracket adapter is to permit the plow as a whole to be shifted in the furrowward direction while yet applying the draft reaction to the link 13 at a point substantially directly behind the connection of the front end of the link 13 with the tractor.

While we have shown and described above the preferred structure in which the principles of the present invention have been incorporated, it is to be understood that widely different means may be employed in the practice of the broader aspects of this invention, as defined in the appended claims.

What we claim, therefore, and desire to secure by Letters Patent is:

1. A disk plow adapted to be connected with the upper and lower, laterally swingable links of a propelling tractor, comprising a frame beam extending generally in a fore-and-aft direction, a frame bracket, a generally vertical mast section connected at its lower end to said bracket and extending generally upwardly therefrom, said mast section having a rearwardly extending lower portion, means adjacent the upper end of said section to receive the rear end of said upper link, a front transverse bar disposed for lateral adjustment in said frame bracket and having means at its ends to receive the rear ends of said lower links, means fixing said transverse bar to said frame bracket in different lateral positions relative thereto, and means for fixing the lower rearwardly extending portion of said mast section to said frame beam in either of two laterally spaced apart positions at opposite sides of said frame beam.

2. A disk plow adapted to be connected with the upper and lower, lateraly swingable links of a propelling tractor, comprising a frame beam extending generally in a fore-and-aft direction, a frame bracket, a generally vertical mast section connected at its lower end to said bracket and extending generally upwardly therefrom, means adjacent the upper end of said section to receive the rear end of said upper link, a front transverse bar disposed for lateral adjustment in said frame bracket and having means at its ends to receive the rear ends of said lower links, means fixing said transverse bar to said frame bracket in different lateral positions relative thereto, means fixing said frame bracket in either of two laterally spaced apart positions to the forward portion of said frame beam, a mast bracket adapter attachable to the upper portion of said mast section, and means carried by said adapter to receive the rear end of said upper link in a position at one side of said mast section.

3. The invention set forth in claim 2, further characterized by a mast brace connected at its rear end to the rear portion of said frame beam, and means connecting the forward end of said bracket to said mast adapter in either of two spaced apart points thereon.

4. An agricultural implement adapted to be connected with the upper and lower links of a propelling tractor, comprising a generally fore-and-aft extending frame, a bracket attachable to the forward portion of said frame at two laterally spaced points, relative thereto, a mast section connected with said bracket and extending generally upwardly therefrom, said mast section including a lower rearwardly extending portion similar in cross section to the forward portion of said frame, and means fixing said forward frame portion and said rearward mast portion to said bracket in either of two positions with the mast portion at one side or the other of the frame portion, optionally.

5. An agricultural implement adapted to be connected with the upper and lower links of a propelling tractor, comprising a generally fore-and-aft extending beam, a bracket receiving the forward end of said beam and having a transverse bar receiving the rear ends of said lower links, means releasably fixing said bracket to said bar in different positions along the latter, said beam being disposable in either of two laterally spaced apart positions on the bracket, a part similar in cross section to the forward portion of said beam, means extending through said part and said beam for fixing them to said bracket in either of said positions, said part being disposed on one side of said beam in one position of the latter and on the other side thereof in the other position of the beam relative to said bracket, and means forming a generally vertical mast extending upwardly from said bracket and connected at its upper end with the rear end of said upper link, said mast means being adjustable with said bracket when the latter is shiftable along said transverse bar.

6. A disk plow adapted to be connected with the upper and lower, laterally swingable links of a propelling tractor, comprising a frame which includes a beam extending generally in a fore-and-aft direction, and a bracket to which the front end of said beam is detachably connected, a transverse bar having means at its ends to receive the rear ends of said lower links, means adjustably connecting said bracket with said bar, said bracket having a generally fore-and-aft extending vertical flange and a generally horizontal section connected with the flange, a part having a portion disposable alongside the front end of said beam at either side of the latter optionally, both said part and the front end of said beam lying against said horizontal section in both positions of said part and beam, said part being disposed in one position between the vertical flange and said beam and in another position of said part in which the beam lies between said vertical flange and said part, and means fastening said part and said beam to said bracket.

7. A disk plow dapted to be connected with the upper and lower, laterally swingable links of a propelling tractor, comprising a frame which includes a beam extending generally in a fore-and-aft direction, and a bracket to which the front end of said beam is detachably connected, a transverse bar having means at its ends to receive the rear ends of said lower links, means adjustably connecting said bracket with said bar, said bracket having a generally horizontal section apertured to receive a pair of fore-and-aft spaced apart fasteners, a part having a portion disposable alongside the front end of said beam at either side of the latter optionally, both said part and the front end of said beam being apertured to receive said spaced apart fasteners when either one or the other of said part or beam end is disposed underneath the apertured portion of said horizontal section, means connecting the other of said beam end and part to said bracket, a disk standard, and a pair of upper and lower plates fixed to the standard, the plates being spaced vertically to receive one or the other of said beam end and part therebetween and apertured to receive said fasteners.

References Cited in the file of this patent

UNITED STATES PATENTS

| | | |
|---|---|---|
| 1,464,199 | Caughey | Aug. 7, 1923 |
| 1,571,853 | McCowan | Feb. 2, 1926 |
| 2,608,145 | Knapp | Aug. 26, 1952 |